United States Patent [19]

Lamoglia

[11] Patent Number: 5,206,764
[45] Date of Patent: Apr. 27, 1993

[54] REFLECTANT NON-GLARE SLIDING PLASTIC EXTENSION COMBINED WITH SUN VISOR'S MIRROR

[76] Inventor: Miguel R. Lamoglia, 635 W. 49th St., Hialeah, Fla. 33012

[21] Appl. No.: 604,911

[22] Filed: Apr. 22, 1991

Related U.S. Application Data

[62] Division of Ser. No. 554,479, Jul. 9, 1990, abandoned.

[51] Int. Cl.⁵ ............................................. G02B 7/18
[52] U.S. Cl. .................................. 359/844; 359/871; 296/97.5; 296/97.8
[58] Field of Search .................... 296/97.2, 97.5, 97.6, 296/97.8; 359/844, 871; 403/377

[56] References Cited

U.S. PATENT DOCUMENTS

| | | | |
|---|---|---|---|
| 3,588,233 | 6/1971 | Lambert | 359/884 |
| 3,957,357 | 5/1976 | Kulikowski | 359/844 |
| 4,736,979 | 4/1988 | Harvey | 296/97.6 |
| 4,978,160 | 12/1990 | Welschoff | 296/97.8 |
| 5,042,867 | 8/1991 | Crotty, III et al. | 296/97.8 |

Primary Examiner—Bruce Y. Arnold
Assistant Examiner—J. P. Ryan

[57] ABSTRACT

A rectangular mirror assembly for attachment to the sun visor of any vehicle which includes an extendible sun shield or anti-glare protection screen encased within the mirror's structure.

3 Claims, 2 Drawing Sheets

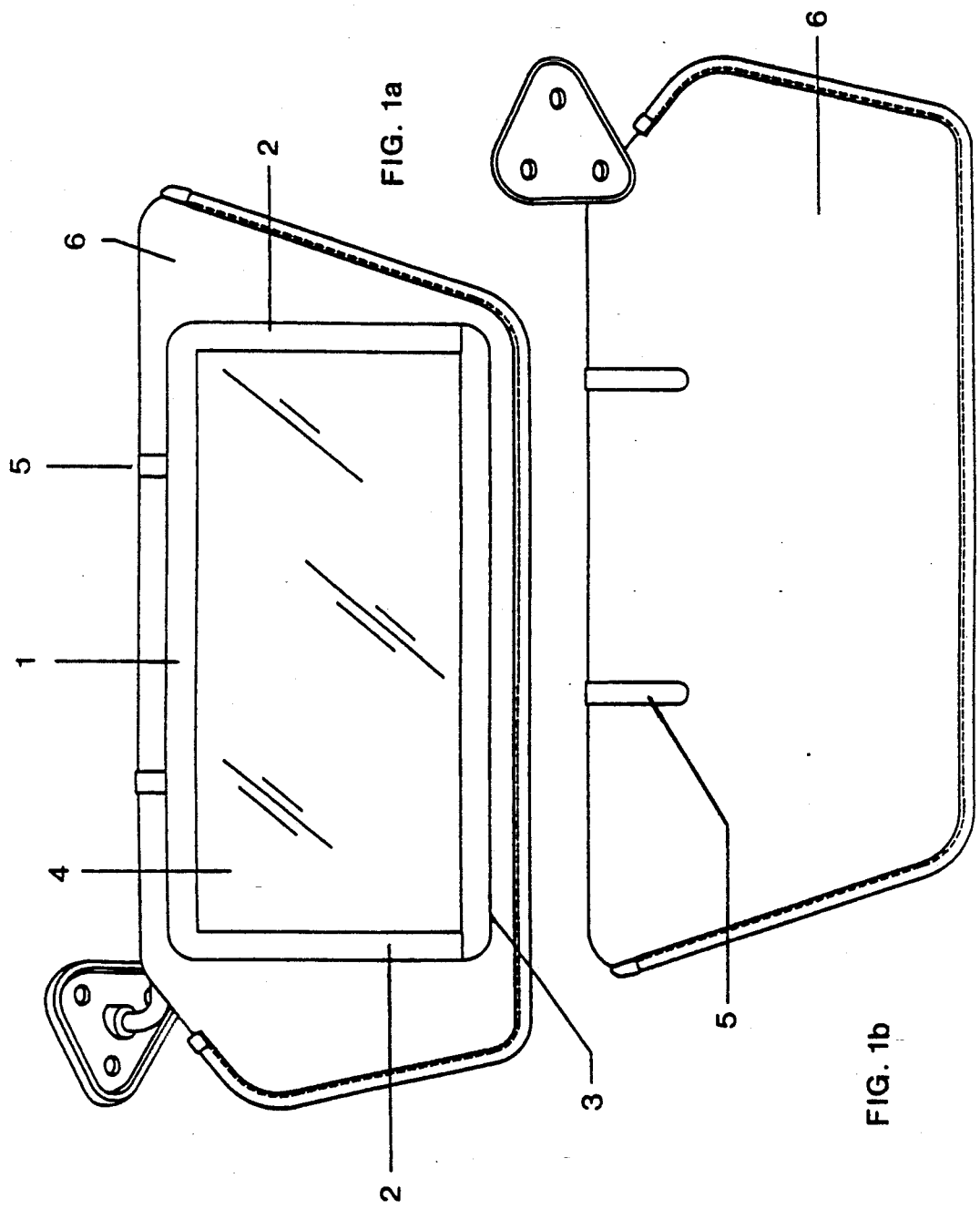

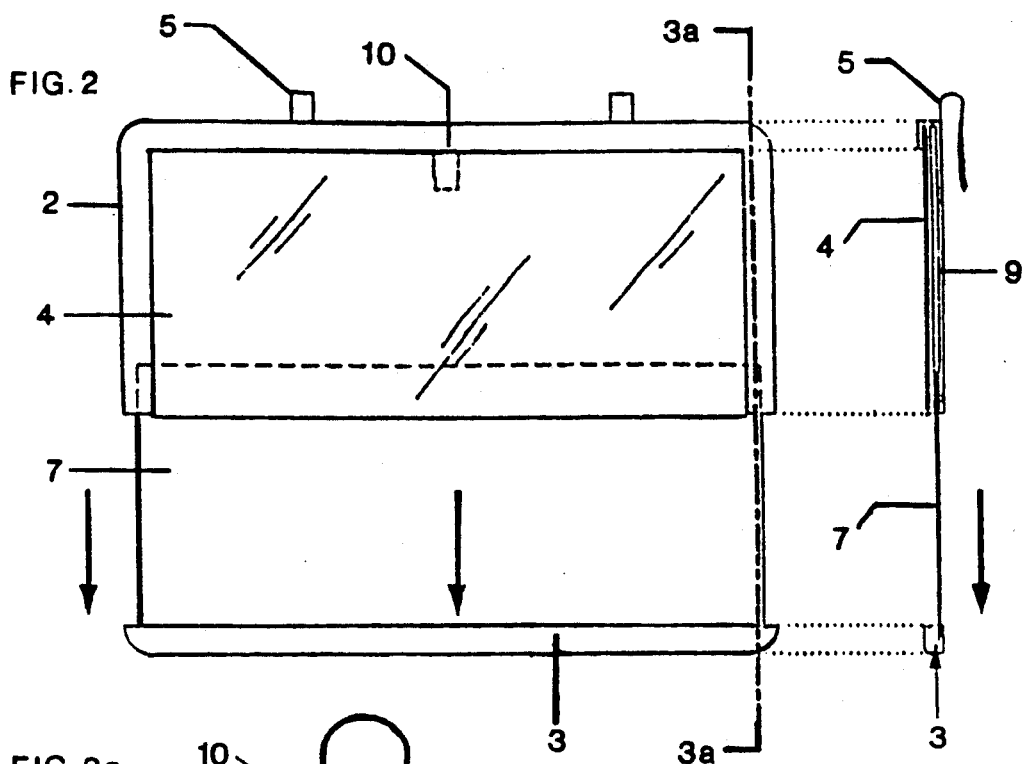
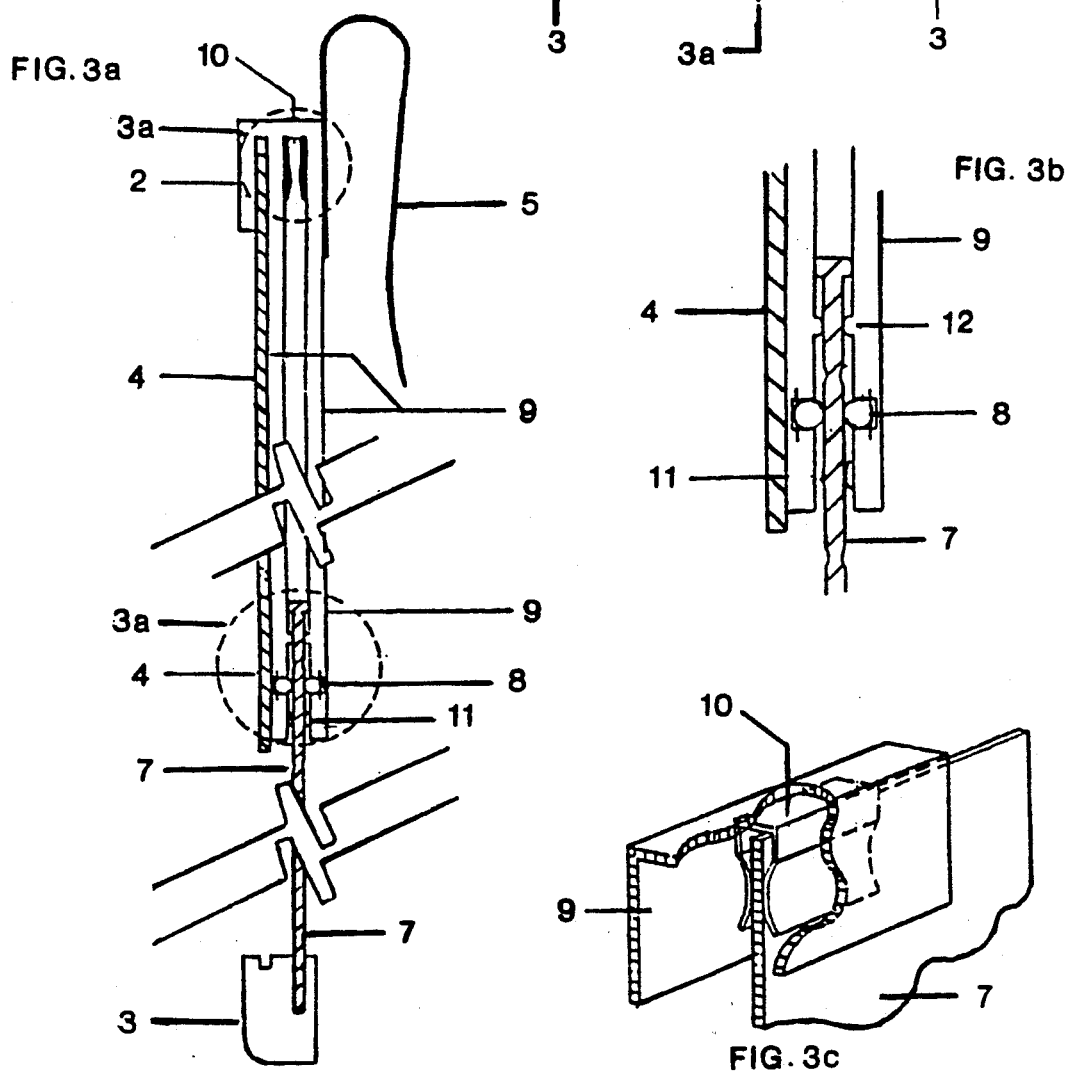

REFLECTANT NON-GLARE SLIDING PLASTIC EXTENSION COMBINED WITH SUN VISOR'S MIRROR

This application is a divisional of Ser. No. 07/554,079, now abandoned, filed Jul. 9, 1990.

1. Field of the Invention

This invention is a vanity mirror which attaches to the sun visor of a vehicle. Included within the mirror's frame structure is a housing for an extendible sun shield, or glare protection screen.

2. Background of the Invention

In the past there have been numerous vanity mirrors attached to vehicle sun visors with different media and some of these mirrors have included housings within their frame structures for extensions of various types. Other designs in this field include the Auxiliary Sun Visor, the Sun Shield, and the Sunshade which have extensions.

The Combination Clip-on Visor Mirror with Sun Shield Extension combines a vanity mirror with an extendible sun shield which is housed in the mirror's structure. This invention attempts to solve the problems that existed with prior arts and combines a vanity mirror and sun shield in one unit. Further, in prior devices, extendible screens for anti-glare use were typically made of hard plastic sheets which had either exposed sharp edges, or were encased in rigid plastic frames. Such screen edges and frames were prone to cause injury (i.e. face and body cuts and bruises) upon contact with a vehicle operator or passenger as they are impacted in an accident or sudden stop. The extendible sun shield presented here solves the aforementioned problem since it is made of a thin and flexible plastic sheet which is horizontally and vertically encased in a soft-rimmed plastic strip.

BRIEF DESCRIPTION OF THE DRAWINGS

FIGS. No. 1A and 1B show front and back views of the present invention.

FIG. 2 shows the invention in the operating mode.

FIGS. 3A–C show details of the cross-section of the present invention.

DESCRIPTION OF THE PREFERRED EMBODIMENT

In FIGS. 1A and 1B the two surfaces of a vehicle sun visor are shown. FIG. 1A is marked "Front View" and FIG. 1B is marked "Back View." Each view is marked with the number 6. Numeral 1. designates the mirror's upper frame side, while numeral 2. designates the mirror's lateral frame sides, and numeral 3. designates the mirror's lower frame. Numeral 4. designates the mirror itself, and numeral 5. designates the visor holding clips on each side.

In the next drawing, FIG. 2., the upper front and sides of the mirror reveal a fully extended sun or anti-glare protective screen (7). The mirror's lower frame (3) is fully extended, or pulled out to maximum length. Contained within that frame (3) is the plastic sheet for glare protection.

FIGS. 3A–C show the complete lateral, or cut out view of the mirror assembly. On the upper side of detail 1. is numeral 10. which designates the glare screen's retainer clip; numeral 2. designates the upper side of the mirror's frame; numeral 5. designates assembly's holding clip, and numeral 4. designates the vanity mirror.

On detail 2. the upper cut-out section is displayed. Numeral 9. indicates the rear glare screen housing; numeral 4. indicates the vanity mirror; numeral 8. indicates the rolling ball clips; numeral 11. indicates a dust cloth; numeral 7. indicates the extendible glare screen, and numeral 3 indicates the lower side of the mirror frame which has a cut-out section that inserts into the mirror's lower edge.

FIG. 3B on the right side of the sketch designates the following assembly parts: numeral 9. indicates the glare screen's rear housing; numeral 4. is the vanity mirror; numeral 12 indicates where the ball clips engage (i.e. a "hollowed out" surface indentation); numeral 8. designates the rolling ball clips, and numeral 11. designates the screen wiper.

Detail 1. in perspective (FIG. 3C) shows the upper side of the glare screen housing as designated by numeral 9. The numeral 7. designates the glare screen. The numeral 10. designates the glare screen retainer clip.

In use, the screen moves from a stored position (FIG. 1A) to an extended position (FIG. 2., upper left side).

In a preferred construction, the glare screen (7) drawing number 2., left and right figures (see FIG. 3A and FIG. 3B), has a stationary pair of rolling balls located at the lower end of the frame. These rolling balls engage in the indentations found on both lateral edges of the glare screen. The rolling balls allow the screen to be extended and to slide down along grooves in the inside of the mirror frame. The sliding pocket structure (9) of the mirror frame coupled with the rolling ball mechanism permits the sun shield to be positioned and adjusted as the vehicle operator desires.

While this invention has been shown and described in what is considered to be a practical and preferred embodiment, it is recognized that departures may be made within the spirit and scope of this invention which should not be limited except as set forth in the claims which follow from and are within the doctrine of equivalents.

I claim:

1. A selectively attachable mirror encased in a frame which is attached with detachable means to the sun visor of a vehicle, and further including: an extendible sun shield located in back of said mirror within said frame; wherein said sun shield is made of a polarized or tinted material and is designed to protect the vehicle operator's eyes from glare projected against the vehicle's windshield; said sun shield both rests within and moves along slotted grooves that line each side of the mirror's frame, whereby the shield is easily pulled down and put into use by the vehicle operator.

2. The sun shield referred to in claim 1 further including four rolling ball clips; one set of clips consisting of at least one rolling ball are located at the upper right and the upper left corners of the sun shield's perimeter. Wherein the upper corners of the shield where the rolling ball clips are located protrude slightly and lock into place when the shield is fully extended to prevent the shield from detaching from the mirror frame.

3. The sun shield of claim 2 wherein the rolling ball clips of the sun shield move freely and slide along the slotted grooves inside the mirror frame; The frame grooves contain a number of indentations, or shallow ball-shaped notches, which are configured to stop the action of the rolling ball clips and lock the shield into place when the user chooses a desired length.

* * * * *